(12) United States Patent
Lambeth

(10) Patent No.: US 8,060,875 B1
(45) Date of Patent: Nov. 15, 2011

(54) SYSTEM AND METHOD FOR MULTIPLE VIRTUAL TEAMS

(75) Inventor: Walter Andrew Lambeth, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 1573 days.

(21) Appl. No.: 11/441,729

(22) Filed: May 26, 2006

(51) Int. Cl.
*G06F 9/455* (2006.01)
*G06F 15/173* (2006.01)
*G06F 15/16* (2006.01)

(52) U.S. Cl. ............ 718/1; 718/104; 709/223; 709/224; 709/225; 709/226; 709/250

(58) Field of Classification Search ............... 718/1, 101, 718/104, 105; 709/250, 238, 223, 224, 235, 709/246; 370/229
See application file for complete search history.

(56) References Cited

U.S. PATENT DOCUMENTS

| | | | | |
|---|---|---|---|---|
| 6,490,632 B1 * | 12/2002 | Vepa et al. | ...................... | 709/250 |
| 6,970,913 B1 * | 11/2005 | Albert et al. | .................... | 709/217 |
| 7,111,303 B2 * | 9/2006 | Macchiano et al. | ........... | 719/313 |
| 7,143,196 B2 * | 11/2006 | Rimmer et al. | ............... | 709/249 |
| 7,177,952 B1 * | 2/2007 | Wurch et al. | ................... | 709/250 |
| 7,213,246 B1 * | 5/2007 | van Rietschote et al. | ......... | 718/1 |
| 7,478,173 B1 * | 1/2009 | Delco | ............................ | 709/250 |
| 7,577,864 B2 * | 8/2009 | Horimoto et al. | .................. | 714/3 |
| 7,656,894 B2 * | 2/2010 | Dube et al. | ...................... | 370/463 |
| 7,711,983 B2 * | 5/2010 | Hatasaki et al. | ................ | 714/13 |
| 7,788,411 B2 * | 8/2010 | Belgaied et al. | ............. | 709/250 |
| 7,934,020 B1 * | 4/2011 | Xu et al. | ........................ | 709/250 |
| 2003/0005350 A1 * | 1/2003 | Koning et al. | ..................... | 714/4 |
| 2004/0009751 A1 * | 1/2004 | Michaelis et al. | .............. | 455/62 |
| 2004/0139236 A1 * | 7/2004 | Mehra et al. | ................... | 709/250 |
| 2004/0158651 A1 * | 8/2004 | Fan et al. | .......................... | 710/1 |
| 2005/0270980 A1 * | 12/2005 | McGee | .......................... | 370/238 |
| 2006/0209718 A1 * | 9/2006 | Kinsey et al. | .................. | 370/254 |
| 2008/0298274 A1 * | 12/2008 | Takashige et al. | ............ | 370/254 |
| 2009/0238072 A1 * | 9/2009 | Tripathi et al. | ................ | 370/235 |
| 2010/0131636 A1 * | 5/2010 | Suri et al. | ....................... | 709/224 |

* cited by examiner

*Primary Examiner* — Emerson Puente
*Assistant Examiner* — Willy W Huaracha

(57) ABSTRACT

A system and method for assigning virtual machines to network interfaces. A first virtual machine is assigned to a network interface according to a first rule and a second virtual machine is assigned to a network interface according to a second rule. The assignment rules are dependent on network conditions as determined through at least one of the network interfaces. The first rule and the second rule may specify assignments differently, such that the same network conditions may result in different assignments for the first and second virtual machines.

37 Claims, 8 Drawing Sheets

PRIOR ART

PRIOR ART

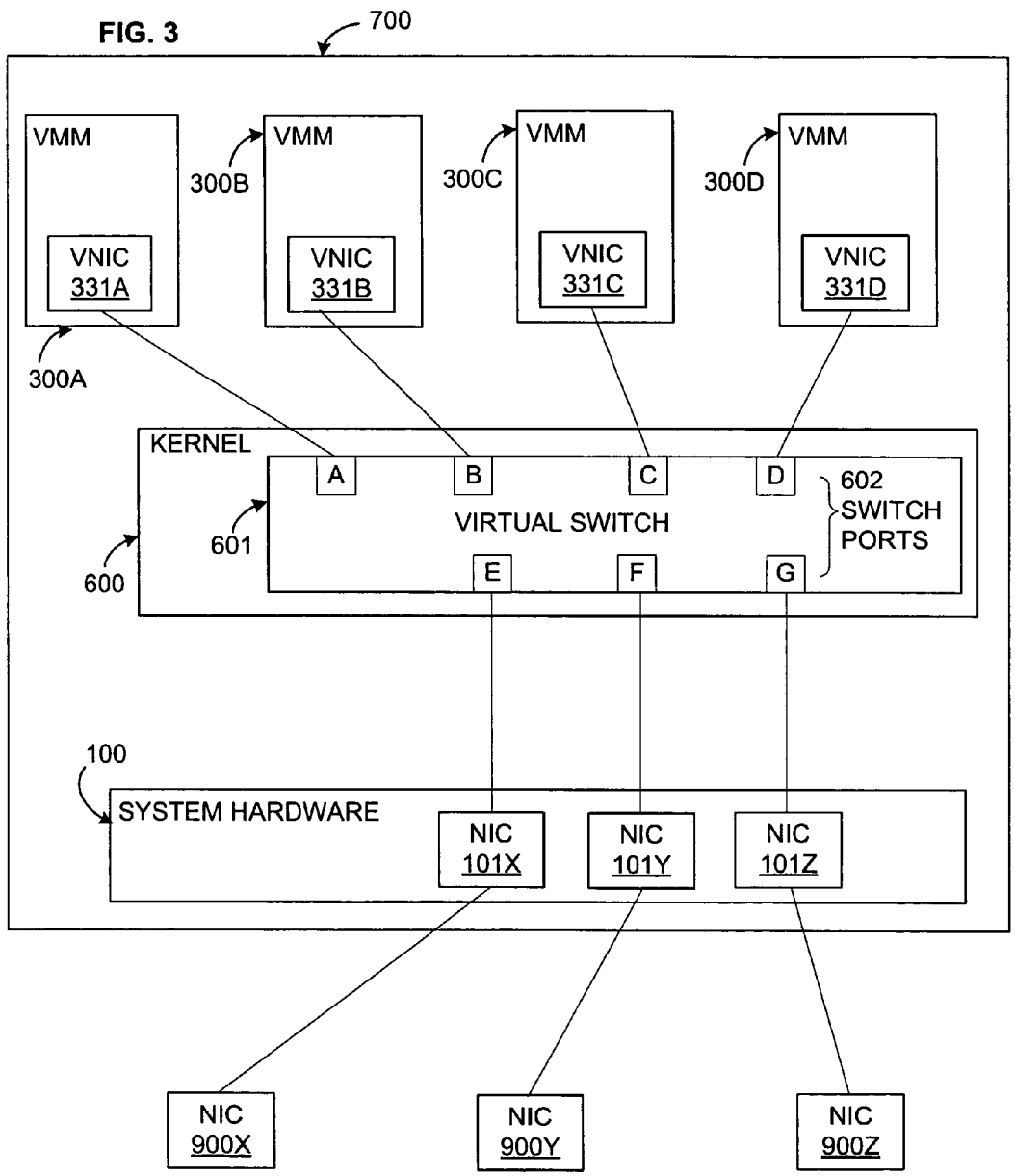

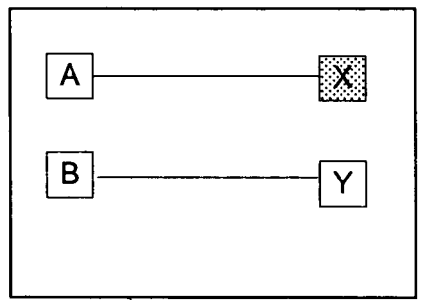
502
Virtual Switch Makes
Assignments
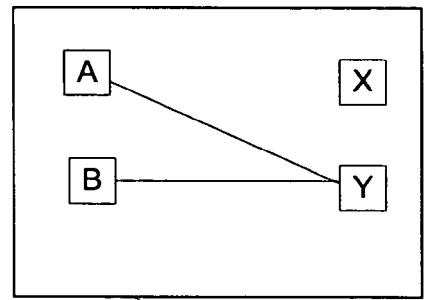
504
Virtual Switch Adjusts
Assignments in
Response to Network
Conditions
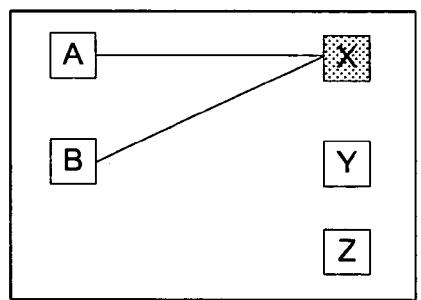
506
Virtual Switch Makes
Assignments
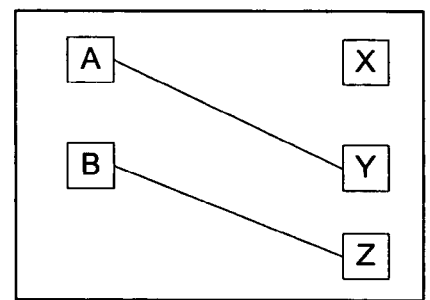
508
Virtual Switch Adjusts
Assignments in
Response to Network
Conditions
FIG. 5a

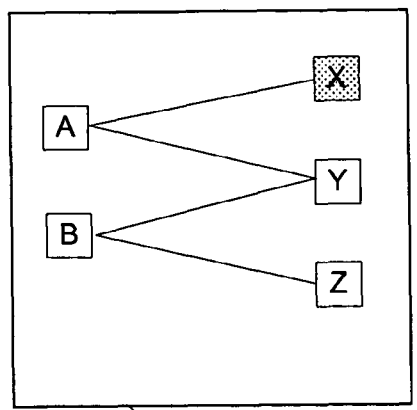
510
Virtual Switch Makes
Assignments
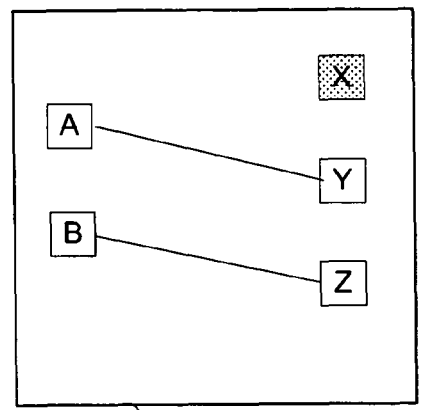
512
Virtual Switch Adjusts
Assignments in
Response to Network
Conditions
FIG. 5b

SYSTEM AND METHOD FOR MULTIPLE VIRTUAL TEAMS

BACKGROUND OF THE INVENTION

1. Field of the Invention

This invention relates generally to computer virtualization and, in particular, to a method and system for assigning virtual machines to network interfaces.

2. Description of Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1 shows one possible arrangement of a computer system 700 that implements virtualization. A VM 200 or "guest," is installed on a "host platform," or simply "host," which will include system hardware 100, that is, a hardware platform, and one or more layers or co-resident components comprising system-level software, such as an operating system (OS) or similar software layer responsible for coordinating and mediating access to hardware resources.

As software, the code defining the VM will ultimately execute on the actual system hardware 100. As in almost all computers, this hardware will include one or more CPUs 110, some form of memory 130 (volatile or non-volatile), one or more storage devices such as one or more disks 140, and one or more devices 170, which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware typically includes at least one virtual CPU 210, virtual memory 230, at least one virtual disk 240 or similar virtualized mass storage device, and one or more virtual devices 270. Note that a disk—virtual 240 or physical 140—is also a "device," but is usually considered separately because of the important role it plays. All of the virtual hardware components of the VM may be implemented in software to emulate corresponding physical components. The guest system software includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as at least some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21m (VCPU0, VCPU1, . . . , VCPUm) within the VM 200. Each virtualized processor in a VM may also be multi-core, or multi-threaded, or both, depending on the virtualization. This invention may be used to advantage regardless of the number of processors the VMs are configured to have.

If the VM 200 is properly designed, applications 260 running on the VM will function essentially as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, the figures show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM, such as the virtual CPU(s) 210, etc., the virtual memory 230, the virtual disk 240, and the virtual device(s) 270, are shown as being part of the VM 200 for the sake of conceptual simplicity. In actuality, these "components" are often implemented as software emulations included in some part of the virtualization software, such as the VMM. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS that is used to perform certain input/output (I/O) operations, alongside and sometimes at the request and direction of a virtualization software component such as the VMM 300. The host OS 420, which usually includes drivers 424 and supports applications 460 of its own, and the VMM (or similar component) are usually both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that may also be included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and/or a binary translator 320 (if translation is implemented), often with an associated translation cache 325, may be included to provide execution speed while still preventing the VM from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted" and is illustrated in FIG. 1. Compared with a system in which VMMs (or other software components or layers with similar functionality) run directly on the hardware platform (such as shown in FIG. 2), use of a kernel typically offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system 420 that, in some systems, is included for such operations as boot the system as a whole or enabling certain user interactions with the kernel. The console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.

One of the devices which may be implemented in either the virtual system hardware 201 or the device emulators 370 is a virtual network device, such as a virtual network interface card (virtual NIC). A virtual NIC allows the guest system 202 to operate with network functionality similar to the network functionality commonly available in a non-virtualized machine. To facilitate the operation of the virtual NIC, the system hardware 100 may includes a physical network device, such as a physical network interface card (physical NIC).

However, as there may be a plurality of virtual NICs and a plurality of physical NICs, managing the connections between the virtual and physical NICs presents several challenges. The various virtual machines may have different requirements for the bandwidth, latency, and reliability of their connections to the network. Furthermore, the network traffic of some virtual machines may be more important than others. Meeting the network connection requirements of the virtual machines is further complicated due to the possibility of changing network conditions. A high-bandwidth connection adequately serving a virtual machine at one moment could slow considerably in the next moment, potentially to a degree such that the connection is no longer adequate for that virtual machine. Therefore, what is needed is a system and method for managing connections between the virtual machines and a plurality of network interfaces.

SUMMARY OF THE INVENTION

The invention is a system and method for assigning virtual machines to network interfaces. A first virtual machine is assigned to a network interface according to a first rule and a second virtual machine is assigned to a network interface according to a second rule. The assignment rules are dependent on network conditions as determined through at least one of the network interfaces. The first rule and the second rule may specify assignments differently, such that the same network conditions sometimes result in different assignments for the first and second virtual machines. According to one embodiment of the present invention, the assignment of virtual machines to network interfaces is performed in a virtual switch. By assigning virtual machines according to different rules, the virtual switch allows for the flexible management of network connections and for the prioritization of traffic originating or destined for the various virtual machines.

BRIEF DESCRIPTION OF THE DRAWINGS

FIG. 3 is an illustration of a computer system implementing a virtual switch, according to one embodiment of the present invention.

FIGS. 5(*a*) and 5(*b*) illustrate several examples of reassignments of virtual machines to network interfaces in response to network conditions, according to one embodiment of the present invention.

DETAILED DESCRIPTION OF THE PREFERRED EMBODIMENTS

A preferred embodiment of the present invention is now described with reference to the figures where like reference numbers indicate identical or functionally similar elements.

The invention is a system and method for assigning virtual machines to network interfaces. In one embodiment, the virtual machines are associated with rules that specify how the virtual machines should be assigned to available network interfaces. Through the assignment rules, the assignments of virtual machines to network interfaces may change over time in response to network conditions. The same network conditions may result in different assignments for the various virtual machines. In one embodiment, virtual machines are assigned to network interfaces in a virtual switch implemented as a component of the virtualization software. While the invention is discussed as being applicable to virtual machines, this example has been selected for the purposes of illustration and is not limiting. Other applications will be apparent to one of skill in the art without departing from the scope of the present invention.

Figure 1:
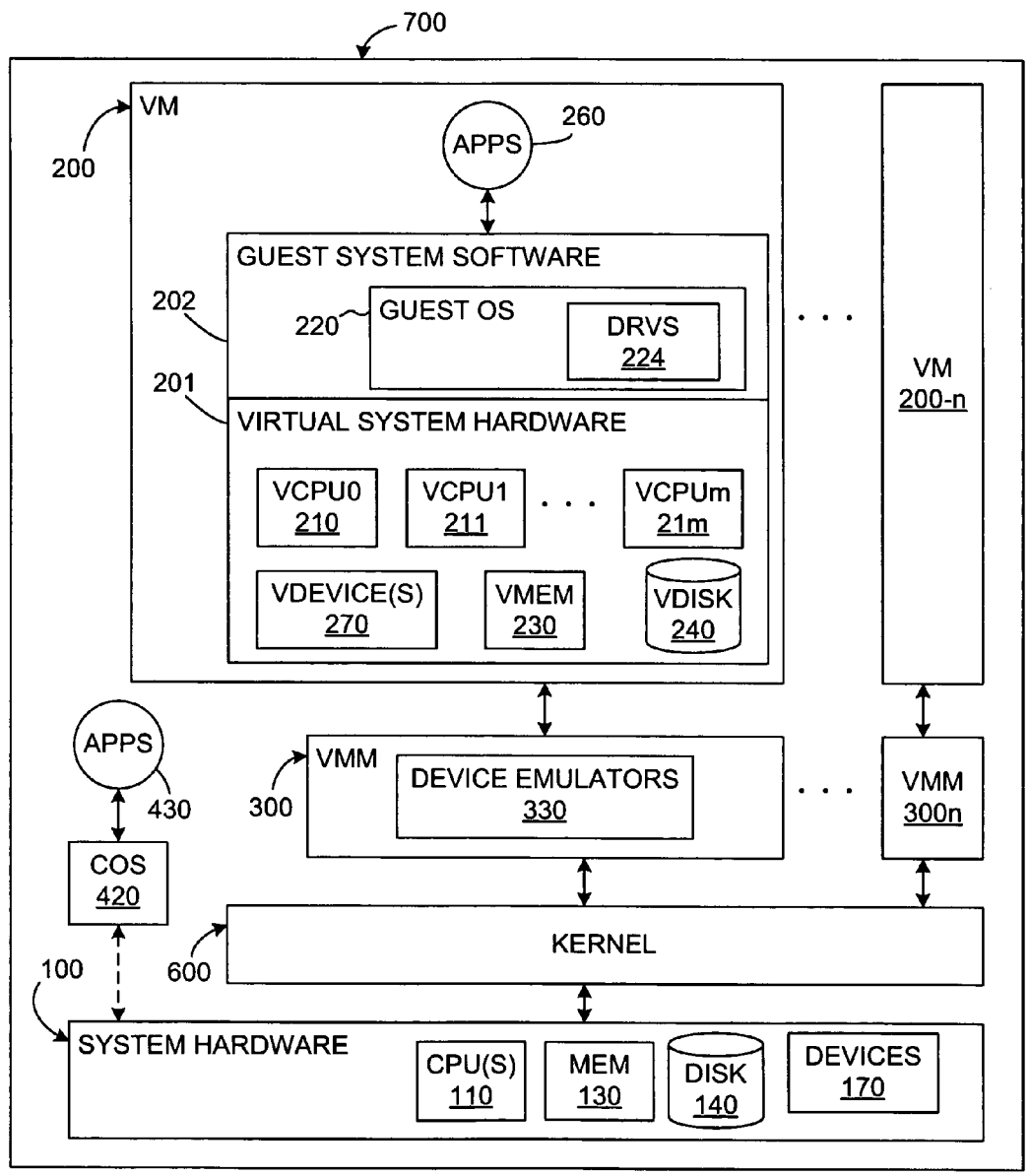
FIG. 1 shows one example of a virtualized computer system in which the present invention can operate.
Figure 2:
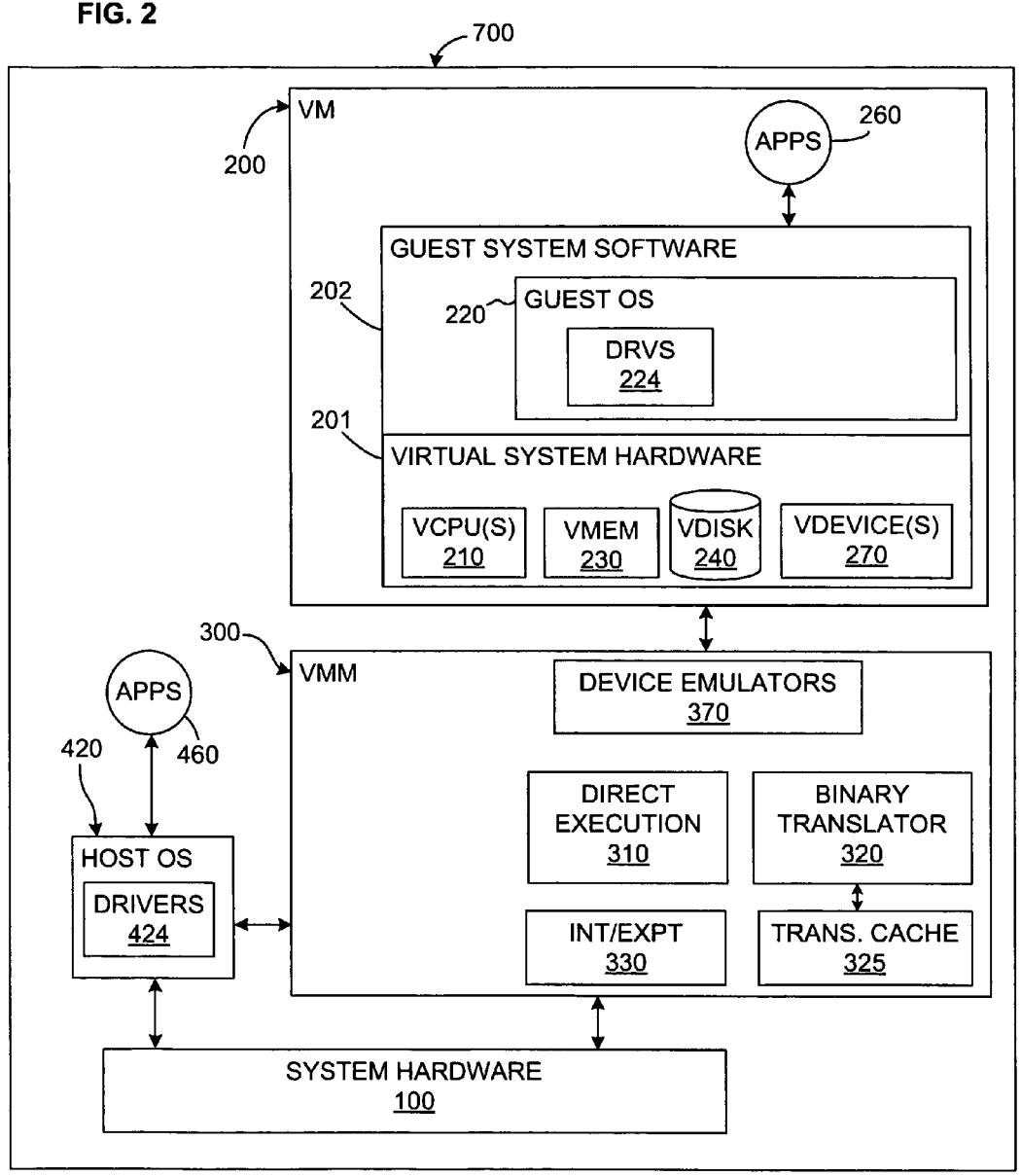
FIG. 2 shows another example of a virtualized computer system in which the present invention can operate.

As described above, FIGS. 1 and 2 depict hosted and non-hosted implementations of virtualized computer systems. The invention is applicable at least to both such implementations of virtualized computer systems, as well as para-virtualized computer systems, non-virtualized computer systems and independent switches and routers.

FIG. 3 is an illustration of a computer system implementing a virtual switch, according to one embodiment of the present invention. A plurality of virtual machine monitors 300 operate in conjunction with a plurality of virtual machines (not shown in FIG. 3). The virtual machine monitors 300 contain at least one virtual network interface card (virtual NIC) 331. A virtual NIC 331 (also referred to as a "virtual network interface") emulates the functionality of a physical network interface card. The virtual machine monitors 300 can contain a plurality of virtual NICs 331, and the computer system 700 can also contain additional virtual machine monitors not containing any virtual NICs 331.

The system hardware 100 contains at least one network interface card (NIC) 101, also commonly referred to as a "network interface." A network interface card 101 may be any device, physical or virtual, allowing communication on a network. According to one embodiment of the present invention, the NIC 101 is a physical network interface card. For example, a NIC 101 could be implemented as an Ethernet device, an 802.11 wireless device, or as a device using a different technology. Other implementations of network interfaces will be apparent to one of skill in the art without departing from the scope of the present invention.

The NICs 101 are connected to some NICs 900 outside of the computer system. The NICs 900 are external to the computer system 700, and facilitate connections to other devices on the network (not shown). Furthermore, any number of connections and relays (not shown) may exist between the NICs 101 and the NICs 900. Typically, the NICs 900 are contained in another physical or virtual switch, or are contained in a group of physical or virtual switches.

Connecting a NIC 101 to a NIC 900 forms a channel through which network traffic can flow to or from the computer system 700. For example, in one embodiment of the present invention, the computer system 700 is connected to a physical switch (not shown). The physical switch contains a group of NICs 900 to which several of the NICs 101 are connected. These connections create a plurality of channels for network traffic to flow between the computer system 700 and the switch. When one or more network channels are available to carry traffic, they may be joined together to form a "team." A team is a collection of network channels over which traffic may be distributed.

The number of virtual NICs 331, NICs 101, and NICs 900 shown in the figure has been selected for the purposes of illustration and is not limiting. Further, the number of each of the virtual NICs 331, NICs 101, and NICs 900 may be different from each other. For example, the number of virtual NICs 331 commonly exceeds the number of NICs 101.

The kernel 600 contains a virtual switch 601. The virtual switch 601 includes several switch ports 602. The switch ports 602 may be connected to either the virtual NICs 331 or the NICs 101. Through the switch ports 602, the virtual switch 601 manages connections between the virtual NICs 331 and the NICs 101. A method used by the virtual switch 601, according to one embodiment of the present invention, is described herein with reference to FIG. 6. According to one embodiment of the present invention, computer instructions for implementing one method used by the virtual switch 601 may be stored on any suitable computer-readable medium.

In one embodiment, a virtual machine may be connected to a network interface as follows. The virtual machine is associated with a corresponding virtual machine monitor, for example VMM 300A, which includes an emulation of a virtual NIC 331A. The virtual NIC 331A is connected to one of the switch ports 602, for example, the switch port 602A. Another switch port, for example, switch port 602E, is connected to one of the NICs 101, for example, the NIC 101X. The virtual switch 601 creates a data path between port 602A and port 602E, connecting the virtual machine to the NIC 101X.

Multiple connections may exist between the VMMs 300 and the virtual switch 601. Similarly, multiple connections may exist between the virtual switch 601 and the NICs 101. According to one embodiment of the present invention, either or both groups of connections may be joined together as any number of teams. Connecting the virtual switch 601 to a plurality of NICs 101, for example, may beneficially increases bandwidth and failover support in the connections between the virtual machines and devices on the network.

While the virtual switch 601 has been shown for the purposes of illustration as being implemented in the kernel of a non-hosted virtual machine, virtual switches could also be implemented in other components of the virtualization software, such as those in hosted virtual machines. These examples are given for the purposes of illustration and are not limiting. Other embodiments of the switch described herein will be apparent to one of skill in the art without departing in scope from the present invention.

Figure 4A:
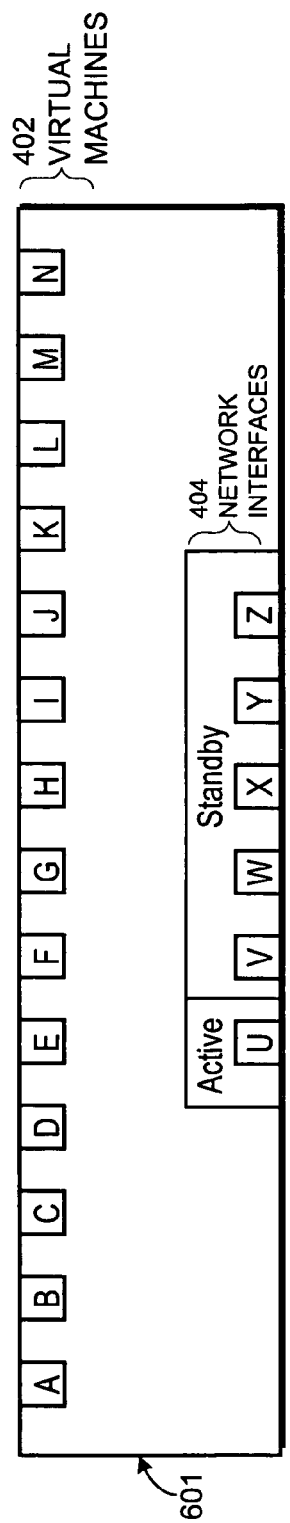
FIGS. 4(*a*) and 4(*b*) are illustrations of assignments of virtual machines to network interfaces according to various rules, according to one embodiment of the present invention.
Figure 4B:
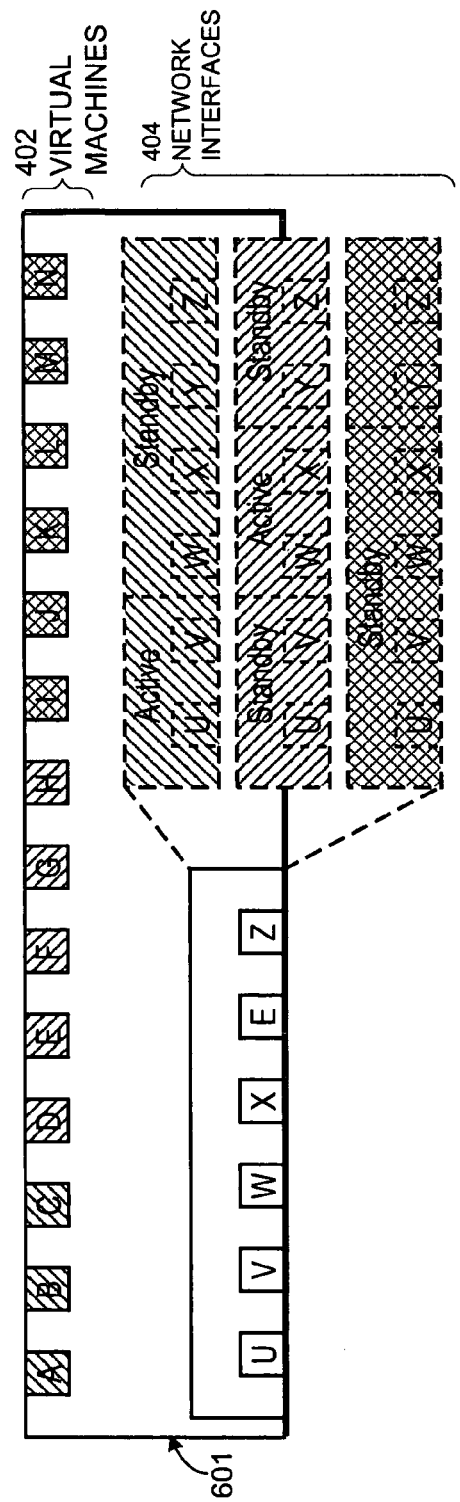

FIGS. 4(*a*) and 4(*b*) are illustrations of assignments of virtual machines to network interfaces according to various rules, according to one embodiment of the present invention. FIGS. 4(*a*) and 4(*b*) show a virtual switch 601, and a group of virtual machines 402 available for assignment to a group of network interfaces 404. For the purposes of illustration, FIGS. 4(*a*) and 4(*b*) show symbolically the virtual machines 402 and network interfaces 404 that are available for assignment on the switch ports 602. As described herein with reference to FIG. 3, other devices and layers of abstraction (for example, virtual machine monitors, virtual or physical NICs), may exist between the virtual machines 402 devices and the virtual switch 601 and between the virtual switch 601 and the network interfaces 404. In one embodiment of the present invention, a virtual machine is assigned to a network interface by connecting the NIC 101 (used herein as an example of a network interface) to the virtual NIC 331 emulated by the virtual machine monitor 300 associated with that virtual machine.

FIG. 4(*a*) illustrates a simple assignment method, in which virtual machines are assigned to NICs in a uniform manner.

When a virtual machine 402 is assigned to a network interface 404, the network interface 404 is considered "active" for that virtual machine 402. In the example illustrated in FIG. 4(*a*), network interface 404U is active for the virtual machines 402. According to one embodiment of the present invention, virtual machines 402 are assigned to network interface 404U in response to network conditions.

When a virtual machine 402 is not currently assigned to a network interface 404, but could be assigned to that network interface 404 in response to network conditions, the network interface 404 is considered "standby" for the virtual machine 402. In the example illustrated in FIG. 4(*a*) network interfaces 404V-Z are standby for the virtual machines 402. Standby status may also define the order in which network interfaces 404 will be made active in response to network conditions. For example, if network conditions determined through network interface 404U indicate a failure, the virtual machines assigned to network interface 404U may be reassigned to 404V. If network conditions subsequently determined through network interface 404V indicate a failure, the virtual machines assigned to network interface 404V may then be reassigned to network interface 404W, and so on. By specifying the order for reassignments, efficient failover can be planned and executed for the network connections of the various virtual machines.

FIG. 4(*b*) illustrates a more sophisticated assignment method, in which virtual machines are assigned to NICs in a manner that varies from virtual machine to virtual machine. In the example illustrated in FIG. 4(*b*), various network interfaces 404 are active for different sets of virtual machines 402. Specifically, network interfaces 404U-V are active for virtual machines 402A-C, network interfaces 404W-X are active for virtual machines 402D-H, and network interfaces 404Y-Z are active for virtual machines 402I-N. According to one embodiment of the present invention, the various virtual machines 402 are assigned to the sets of network interface 404 in response to network conditions.

Similarly, various network interfaces 404 are standby for different sets of virtual machines 402. For example, if network conditions determined through network interface 404U indicate a failure, virtual machines 402A-C may be reassigned to network interface 404W. In one embodiment, virtual machines 402A-C may be reassigned to network interface 404W without affecting the assignments of the other virtual machines 402. As assignments are governed by rules that are specific to virtual machines (or groups of virtual machines), different virtual machines may be reassigned differently in response to the same network conditions. For example, if network conditions subsequently determined through network interface 404W indicate a failure, the virtual machines 402A-C may be reassigned to network interface 404X, while virtual machines 404D-H (previously active on network interface 404X) may be reassigned to network interface 404Y.

A set of network conditions can include any metric related to the performance or operation of a network to which a network interface is connected. For example, network conditions can include response time from other devices on the network, available bandwidth, interface throughput capacity, or other measures of network performance or availability. In some situations, network conditions determined through a network interface indicate a failure of the network connection through that network interface. For example, if response time is infinite and available bandwidth is zero, the connection from the network interface to the network may have failed entirely, i.e. a "hard failure." As another example, if response time is high and available bandwidth is low, the connection from the network interface to the network may be failing to perform at levels ideal for the virtual machine. Poor performance without total failure of the connection may constitute a "soft failure." Hard and soft failures can affect either individual or groups of network interfaces. Both hard and soft failures can be beneficially used as inputs to reassignment of virtual machines to network interfaces.

Various types of failure can also be weighted such that certain types of failure influence reassignment more strongly than other types of failure. For example, for the purposes of reassignment a single hard failure may be given the same significance as multiple soft failures. As another example, the degree of a soft failure can influence the reassignment of virtual machines to network interfaces.

Further, in other situations network conditions determined through a network interface indicate additional network capacity. For example, available bandwidth might indicate that the network connection from the network interface to the network is capable of handling additional traffic. Thus determined network conditions, even network conditions not indicative of failure, can be beneficially used as inputs to reassignment of virtual machines to network interfaces.

Assigning virtual machines based on network conditions beneficially assists in the goal of meeting the network requirements for the various virtual machines. For example, a first virtual machine might benefit from a low-latency network connection, while a second virtual machine might benefit from a high-bandwidth network connection. Assigning these virtual machines based on virtual machine-specific rules in light of network conditions could, in many circumstances, improve the network performance of both virtual machines.

The rules used to assign virtual machines to network interfaces can vary from virtual machine to virtual machine. According to one embodiment of the present invention, rules for assigning virtual machines to network interfaces are configurable by a user. The user may specify a rule describing, for example, the minimum bandwidth, maximum latency, minimum total number of network interfaces, teaming with other virtual machines, and the virtual machines to be influenced by the rule. Other examples of rules which may be specified by the user will be apparent to one of skill in the art without departing from the scope of the present invention.

FIGS. 5(a) and 5(b) illustrate several examples of reassignments of virtual machines to network interfaces in response to network conditions, according to one embodiment of the present invention. In FIGS. 5(a) and 5(b), the reference characters "A" and "B" are used to represent virtual machines, while the reference characters "X", "Y", and "Z" are used to represent network interfaces. For the purposes of illustration, the virtual machines and network devices have been shown as single units, but the entities illustrated in the figure can in fact represent sets of that type of entity. For example, virtual machine A could in fact represent a set of virtual machines. Similarly, network device X could in fact represent a set of network devices.

Diagram 502 illustrates an example of assignments between virtual machines A and B and network interfaces X and Y. The virtual switch 601 assigns virtual machine A to network interface X, and virtual machine B to network interface Y.

The virtual switch 601 determines a first set of network conditions through network interface X. In the example illustrated, the network conditions determined through network interface X have characteristics indicative of a failure.

Diagram 504 illustrates an example of a reassignment responsive to a rule for virtual machine A and network conditions. In response to the network conditions determined through network interface X, the virtual switch 601 reassigns virtual machine A to network interface Y. For example, the network conditions could indicate a soft failure on network interface X, and the assignment rule for virtual machine A could specify that virtual machine X should be reassigned in case of soft failure.

According to one embodiment of the present invention, the definition of hard or soft failure for the network interface could be rule-dependent. For example, the rule for virtual machine A's assignment could specify that virtual machine A should be reassigned if the network interface response time drops below a certain threshold. Reassigning a virtual machine if a performance metric for a network interface drops below a threshold beneficially allows virtual machines to be assigned to network interfaces that will meet the performance criteria of the virtual machine.

Diagram 506 illustrates an example of assignments between virtual machines A and B and network interfaces X, Y, and Z. The virtual switch 601 assigns virtual machine A and virtual machine B to network interface X.

The virtual switch 601 determines network conditions through network interface X. In the example illustrated, the network conditions determined through network interface X indicate a failure.

Diagram 508 illustrates an example of a potential reassignment in response to a failure according to a rule for virtual machine A. In response to the determination of network conditions through network interface X, the virtual switch 601 reassigns virtual machine A to network interface Y and reassigns virtual machine B to network interface Z. For example, the network conditions determined on network interface X could be indicative of a soft failure. Depending on the rule for virtual machine A's assignment, the virtual switch 601 can reassign virtual machine A in response to the detected failure. Furthermore, depending on the rule for virtual machine B's assignment, the virtual switch 601 can reassign virtual machine B in response to the detected failure. The rule for virtual machine A's assignment may be different from the rule for virtual machine B's assignment, for example as illustrated in diagram 508. Assigning different virtual machines according to different rules allows for the prioritization of network traffic originating from or destined to the various virtual machines.

As another example, the rule for virtual machine A's assignment may be different from the rule for virtual machine B's assignment in their threshold for soft failure. For example, the rule for virtual machine A's assignment may define the network conditions through network interface X to be a soft failure and specify that A should be reassigned, while at the same time the rule for virtual machine B's assignment may define the network conditions through network interface X to be satisfactory and specify that B should not be reassigned. The same network conditions may result in different reassignments for the virtual machines depending on their various assignment rules. Such a difference in assignment rules would be particularly beneficial when the two virtual machines have different network connection specifications.

Diagram 510 illustrates an example of potential assignments between virtual machines A and B and network interfaces X, Y, and Z. The virtual switch 601 assigns virtual machine A to network interfaces X and Y, and assigns virtual machine B to network interfaces Y and Z.

The virtual switch 601 determines network conditions through network interface X. In the example illustrated, the network conditions determined through network interface X indicate a failure.

Diagram 512 illustrates an example of a potential reassignment in response to a failure according to a rule for virtual machine A. In response to the determination of network conditions through network interface X, the virtual switch 601 reassigns virtual machine A to network interface Y and reassigns virtual machine B to network interface Z. For example, the network conditions determined on network interface X could be indicative of a hard failure. Depending on the rule for virtual machine A's assignment, the virtual switch 601 can reassign virtual machine A in response to the suspected failure. Furthermore, depending on the rule for virtual machine B's assignment, the virtual switch 601 can reassign virtual machine B in response to the detected failure, even though virtual machine B was not assigned to the network interface through which the failure was detected. Not only may the rule for virtual machine A's assignment may be different from the rule for virtual machine B's assignment, but also the rule for virtual machine B's assignment may be dependent on some on virtual machine A's assignment, for example as illustrated in diagram 512. This response would be useful, for example, if virtual machine B operated most efficiently with at least one network interface to itself. Thus, network conditions may result in reassignments for any of the virtual machines depending on their assignment rules, even virtual machines not assigned to the affected network interface.

The examples of rules illustrated herein are given for the purposes of illustration, and are neither exhaustive nor limiting. Countless other examples of rules (and outcomes of applying those rules to various scenarios) are relevant to the present invention. One of skill in the art will recognize other applications and embodiment of rules for assigning virtual machines to network interfaces without departing from the scope of the present invention.

Figure 6:
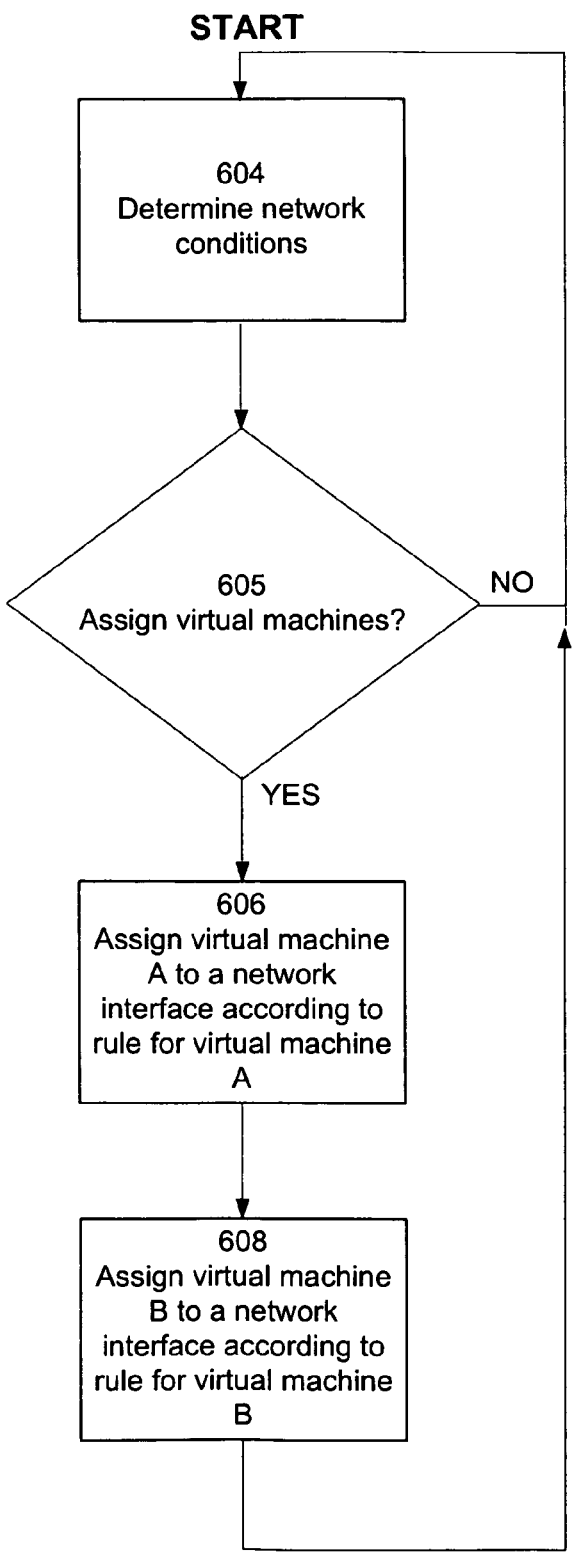
FIG. 6 is a flow chart illustrating a method for assigning virtual machine to network interfaces, according to one embodiment of the present invention.

FIG. 6 is a flow chart illustrating a method for assigning virtual machines to network interfaces, according to one embodiment of the present invention. According to one embodiment of the present invention, the method is performed by the virtual switch 601.

The virtual switch 601 determines 604 network conditions. According to one embodiment of the present invention, the virtual switch 601 determines 604 network conditions through one of the network interfaces. For example, the virtual switch 601 may test the network response time, the available bandwidth, the total interface throughput, or other metrics for network performance. According to one embodiment of the present invention, the virtual switch 601 determines 604 network conditions by sending a beacon frame through one network interface and measuring the time until the beacon frame is received on the other network interfaces. If the beacon frame is not received on one of the other network interfaces, or is received in only a small percentage of trials, or if the measured latency exceeds a certain threshold, the virtual switch 601 may detect a failure.

According to another embodiment of the present invention, the virtual switch 601 determines 604 network conditions by querying the network interface for network conditions. For example, the network interface may have an autonegotiated throughput setting that is indicative of network conditions. An autonegotiated throughput setting below a certain threshold may be indicative of a failure. As another example, the network interface may have error reporting capabilities built-in, such as buffer overflow detection. Such an overflow at the level of the network hardware could be a result of a network failure. Querying the network interface for network conditions is an efficient and transparent approach for determining network conditions.

According to another embodiment of the present invention, the virtual switch 601 determines 604 network conditions by sending a packet that will generate a response, such as an Internet Control Message Protocol (ICMP) echo packet (commonly referred to as a "ping" packet) to a destination on the network. The network latency may be determined by measuring the round trip time of the packet.

The methods described herein for determining network conditions are given for the purposes of illustration and are not limiting. Other methods for determining network conditions will be apparent to one of skill in the art without departing from the scope of the present invention.

The virtual switch 601 determines 605, based on network conditions and the rules for the various virtual machines, if the virtual machines should be reassigned to network interfaces. For example, the virtual switch 601 may determine 605 if network conditions have changed sufficiently from the last determination 604 to merit reassignment. In cases in which the virtual machines have not yet been assigned to network interfaces, any network conditions would merit assignment.

The threshold for reassignment may vary from virtual machine to virtual machine. For example, the assignment rules for virtual machine A may indicate that reassignment should be evaluated if network conditions change only slightly, while at the same time the assignment rules for virtual machine B indicate that reassignment should be evaluated only in the case of drastic changes to network conditions. The virtual switch 601 may accommodate various reassignment thresholds, for example, by reassigning only those virtual machines with rules indicating reassignments should be made given the network conditions. Determining 605 if virtual machines should be reassigned is optional, but beneficially avoids reassignment if network conditions are stable.

The virtual switch 601 assigns 606 virtual machine A to a network interface, according to the rule for virtual machine A. The assignment 606 may depend on the determined 604 network conditions in conjunction with the rule for virtual machine A. For example, the rule for virtual machine A may specify that virtual machine A should be assigned to a first network interface in certain network conditions and should be assigned to a second network interface in other network conditions, or that virtual machine A should be assigned to a network interface exhibiting certain network conditions. According to one embodiment of the present invention, the virtual switch 601 sends a reverse address resolution protocol packet including the address of virtual machine A through the network interface to update other network devices regarding the assignment of virtual machine A to the network interface.

The virtual switch 601 assigns 608 virtual machine B to a network interface, according to the rule for virtual machine B. Similarly, the assignment 608 may be dependent on the determined 602 network conditions in conjunction with the rule for virtual machine B. The rule for virtual machine B may be different from the rule for virtual machine A, such that the same network conditions result in different assignments for virtual machine A and virtual machine B. Similarly, certain network conditions may result in the same assignment for virtual machine A and virtual machine B. According to one embodiment of the present invention, the virtual switch 601 sends a reverse address resolution protocol packet including the address of virtual machine B through the network interface to update other network devices regarding the assignment of virtual machine B to the network interface.

The assignment 606 and assignment 608 may assign the virtual machines to groups of network interfaces. For example, the virtual switch 601 may assign 606 virtual machine A to a first group of network interfaces, and assign 608 virtual machine B to a second group of network interfaces. Furthermore, the first group of network interfaces may share some network interfaces in common with the second group of network interfaces. When virtual machines are assigned to a common set of network interfaces, the virtual switch 601 may group the connections to the network interfaces into a team. According to one embodiment of the present invention, the virtual switch 601 may group the connections to the network interfaces into a team. Teaming can beneficially provide failover support and load distribution between a group of network conditions, thereby improving network performance.

Additional assignment steps may occur at levels higher or lower than the assignment 606 and assignment 608. For example, if the virtual switch 601 assigns 606 virtual machine A to a first group of network interfaces, the virtual switch 601 may later assign virtual machine A to a specific network interface from the first group. According to one embodiment of the present invention, virtual machines are assigned to groups of network interfaces according to rules dependent on network conditions, and virtual machines are later assigned to network interfaces within their assigned group. Assigning virtual machines at various levels of hierarchy beneficially allows strategic decisions, such as how groups of virtual machines should be assigned to groups of network interfaces according to network decisions, to be separated from more specific tactical decisions, such as how packet-level traffic from a virtual machine should be distributed over a group of network interfaces. Thus the overall priority of virtual machines and their various network constraints may be enforced, while beneficially allowing flexibility in specific assignments of virtual machines to network interfaces.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the actions and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, the computers referred to in the specification may include a single processor or may be architectures employing multiple processor designs for increased computing capability.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for assigning virtual machines to network interfaces, the method comprising the steps of:

assigning a first virtual machine operating in a computer system to a first network interface of said computer system;

assigning a second virtual machine operating in said computer system to said first network interface;

determining a first set of network conditions through said first network interface;

responsive to said first set of network conditions, reassigning said first virtual machine to a second network interface of said computer system and reassigning said second virtual machine to a third network interface of said computer system; and wherein said assigning said first virtual machine to said first network interface comprises connecting a first virtual network interface card to said first network interface and wherein said assigning said second virtual machine to said first network interface comprises connecting a second virtual network interface card to said first network interface.

2. The method of claim 1, further comprising determining a second set of network conditions.

3. The method of claim 2, wherein said assigning said first virtual machine to said first network interface is responsive to said second set of network conditions, and wherein said assigning said second virtual machine to said first network interface is responsive to said second set of network conditions.

4. The method of claim 3, wherein said determining said first set of network conditions through said first network interface further comprises determining if said first set of network conditions are different from said second set of network conditions.

5. The method of claim 2, wherein said reassigning said first virtual machine to said second network interface and reassigning said second virtual machine to said third network interface is responsive to said first set of network conditions and said second set of network conditions.

6. The method of claim 1, wherein said reassigning said first virtual machine to said second network interface is responsive to a first rule and said reassigning said second virtual machine to said third network interface is responsive to a second rule, wherein said first rule and said second rule specify different assignments responsive to said first set of network conditions.

7. The method of claim 1, wherein said determining said first set of network conditions through said first network interface comprises querying said first network interface for network conditions.

8. The method of claim 1, wherein the method is performed in a virtual switch of said computer system.

9. The method of claim 1, wherein the method is performed in a virtual machine monitor of said computer system.

10. The method of claim 1, wherein the method is performed in an operating system kernel of said computer system.

11. A method for assigning virtual machines to network interfaces, the method comprising the steps of:
assigning a first virtual machine operating in a computer system to a first network interface of said computer system;
assigning a second virtual machine operating in said computer system to a second network interface of said computer system;
determining a first set of network conditions through said first network interface;
responsive to said first set of network conditions, reassigning said first virtual machine to said second network interface; and
wherein said assigning said first virtual machine to said first network interface comprises connecting a first virtual network interface card to said first network interface and wherein said assigning said second virtual machine to said second network interface comprises connecting a second virtual network interface card to said second network interface.

12. The method of claim 11, further comprising: responsive to said first set of network conditions, reassigning said second virtual machine to a third network interface.

13. The method of claim 11, further comprising determining a second set of network conditions.

14. The method of claim 13, wherein said assigning said first virtual machine to said first network interface is responsive to said second set of network conditions, and wherein said assigning said second virtual machine to said second network interface is responsive to said second set of network conditions.

15. The method of claim 14, wherein said determining said first set of network conditions through said first network interface further comprises determining if said first set of network conditions are different from said second set of network conditions.

16. The method of claim 13, wherein said reassigning said first virtual machine to said second network interface is responsive to said first set of network conditions and said second set of network conditions.

17. The method of claim 11, wherein said assigning said first virtual machine to said first network interface is responsive to a first rule and said assigning said second virtual machine to said first network interface is responsive to a second rule, wherein said first rule and said second rule specify different reassignments responsive to said first set of network conditions.

18. The method of claim 11, wherein said determining said first set of network conditions through said first network interface comprises querying said first network interface for network conditions.

19. The method of claim 11, wherein the method is performed in a virtual switch of said computer system.

20. The method of claim 11, wherein the method is performed in a virtual machine monitor of said computer system.

21. The method of claim 11, wherein the method is performed in an operating system kernel of said computer system.

22. A method for assigning virtual machines to network interfaces, the method comprising the steps of:
assigning a first virtual machine operating in a computer system to a first set of network interfaces of said computer system, said first set of network interfaces comprising a first network interface and a second network interface;
assigning a second virtual machine to a second set of network interfaces of said computer system, said second set of network interfaces comprising said second network interface and a third network interface;
determining a first set of network conditions through said first network interface;
responsive to said first set of network conditions, reassigning said first virtual machine to said second network interface, and reassigning said second virtual machine to said third network interface; and
wherein said assigning said first virtual machine to said first set of network interfaces comprises connecting a first virtual network interface card to said first network interface and said second network interface, and wherein said assigning said second virtual machine to said second set of network interfaces comprises connecting a second virtual network interface card to said second network interface and said third network interface.

23. The method of claim 22, further comprising determining a second set of network conditions.

24. The method of claim 23, wherein said assigning said first virtual machine to said first set of network interfaces is responsive to said second set of network conditions, and wherein said assigning said second virtual machine to said second set of network interfaces is responsive to said second set of network conditions.

25. The method of claim 24, wherein said determining said first set of network conditions through said first network interface further comprises determining if said first set of network conditions are different from said second set of network conditions.

26. The method of claim 23, wherein said reassigning said first virtual machine to said second network interface and reassigning said second virtual machine to said third network interface is responsive to said first set of network conditions and said second set of network conditions.

27. The method of claim 22, wherein said reassigning said first virtual machine to said second network interface is responsive to a first rule and said reassigning said second virtual machine to said third network interface is responsive to a second rule, wherein said first rule and said second rule specify different assignments responsive to said first set of network conditions.

28. The method of claim 22, wherein said determining said first set of network conditions through said first network interface comprises querying said first network interface for network conditions.

29. The method of claim 22, wherein the method is performed in a virtual switch of said computer system.

30. The method of claim 22, wherein the method is performed in a virtual machine monitor of said computer system.

31. The method of claim 22, wherein the method is performed in an operating system kernel of said computer system.

32. A method for assigning virtual machines to network interfaces, the method comprising the steps of:
determining network conditions through a first set of network interfaces of a computer system:
assigning a first virtual machine operating in said computer system to said first set of network interfaces, wherein said assignment is responsive to said network conditions and a first rule;

assigning a second virtual machine operating in said computer system to a second set of network interfaces of said computer system, wherein said assignment is responsive to said network conditions and a second rule, wherein said first rule and said second rule specify different assignments responsive to said network conditions; and wherein said assigning said first virtual machine to said first set of network interfaces comprises connecting a first virtual network interface card to said first set of network interfaces, and wherein said assigning said second virtual machine to said second set of network interfaces comprises connecting a second virtual network interface card to said second set of network interfaces.

33. The method of claim 32, wherein said first set of network interfaces comprises a plurality of network interfaces, said plurality of network interfaces comprising at least a first network interface and a second network interface.

34. The method of claim 33, further comprising the step of:
assigning said first virtual machine to said first network interface.

35. A system for connecting a virtual machine to a network, the system comprising:
a first virtual network interface card;
a second virtual network interface card;
a first physical network interface card;
a second physical network interface card; and
a virtual switch, configured to determine network conditions through said first physical network interface card, connecting said first virtual network interface card to said first physical network interface card according to a first rule, and connecting said second virtual network interface card to said second network interface card according to a second rule, wherein said first rule and said second rule specify different connections responsive to said network conditions.

36. The system of claim 35, additionally comprising:
a first virtual machine configured to transmit data through said first virtual network interface card; and
a second virtual machine configured to transmit data through said second virtual network interface card.

37. A non-transitory computer storage medium for assigning virtual machines to network interfaces, the non-transitory computer storage medium comprising a first computer-readable medium, the first computer readable medium comprising:
computer code for determining network conditions through a first set of network interfaces of a computer system;
computer code for assigning a first virtual machine operating in said computer system to said first set of network interfaces, wherein said assignment is responsive to said network conditions and a first rule;
computer code for assigning a second virtual machine operating in said computer system to a second set of network interfaces of said computer system, wherein said assignment is responsive to said network conditions and a second rule, wherein said first rule and said second rule specify different assignments responsive to said network conditions; and
wherein said assigning said first virtual machine to said first set of network interfaces comprises connecting a first virtual network interface card to said first set of network interfaces, and wherein said assigning said second virtual machine to said second set of network interfaces comprises connecting a second virtual network interface card to said second set of network interfaces.

* * * * *